US012509911B2

(12) United States Patent
Zerbe

(10) Patent No.: US 12,509,911 B2
(45) Date of Patent: Dec. 30, 2025

(54) VEHICULAR DOOR HANDLE ASSEMBLY

(71) Applicant: Magna Mirrors of America, Inc., Holland, MI (US)

(72) Inventor: Marshall A. Zerbe, Decatur, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 18/894,389

(22) Filed: Sep. 24, 2024

(65) Prior Publication Data

US 2025/0101768 A1    Mar. 27, 2025

Related U.S. Application Data

(60) Provisional application No. 63/592,594, filed on Oct. 24, 2023, provisional application No. 63/584,999, filed on Sep. 25, 2023.

(51) Int. Cl.
  *E05B 17/10* (2006.01)
  *B60Q 1/32* (2006.01)
  *B60Q 3/267* (2017.01)
  *E05B 85/10* (2014.01)
  *F21S 43/235* (2018.01)

(52) U.S. Cl.
  CPC .............. *E05B 17/10* (2013.01); *B60Q 1/323* (2013.01); *B60Q 1/324* (2022.05); *B60Q 3/267* (2017.02); *E05B 85/10* (2013.01); *F21S 43/235* (2018.01); *B60Q 2400/40* (2013.01)

(58) Field of Classification Search
  CPC ........ B60Q 1/323; B60Q 1/324; B60Q 3/267; B60Q 2400/40; F21S 43/235; E05B 17/10; E05B 85/10

USPC ................................................. 362/501, 511
  See application file for complete search history.

(56) References Cited

U.S. PATENT DOCUMENTS

| | | | |
|---|---|---|---|
| 5,371,659 A | 12/1994 | Pastrick et al. |
| 5,497,305 A | 3/1996 | Pastrick et al. |
| 5,669,699 A | 9/1997 | Pastrick et al. |
| 5,671,996 A | 9/1997 | Bos et al. |
| 5,823,654 A | 10/1998 | Pastrick et al. |
| 5,938,321 A | 8/1999 | Bos et al. |

(Continued)

FOREIGN PATENT DOCUMENTS

| | | | |
|---|---|---|---|
| CN | 210530554 U | * | 5/2020 |
| WO | WO-2023098835 A1 | * | 6/2023 |

OTHER PUBLICATIONS

Machine translation of CN210530554U, 2019 (Year: 2019).*

*Primary Examiner* — Laura K Tso

(74) *Attorney, Agent, or Firm* — HONIGMAN LLP

(57) ABSTRACT

A vehicular exterior door handle assembly includes a base portion that mounts at a door and a handle portion. The handle portion is movable relative to the base portion between a recessed position and an extended position. A light module is disposed between the base portion and an outer panel of the door at or near a cutout region of the outer panel of the door. With the handle portion in the recessed position, a light emitting element of the light module at least partially circumscribes the handle portion. With the handle portion in the extended position, the handle portion extends at least partially through the cutout region. With the handle portion in the extended position, the light emitting element emits light that passes through the cutout region of the outer panel of the door to illuminate the handle portion.

12 Claims, 17 Drawing Sheets

(56) References Cited

U.S. PATENT DOCUMENTS

| | | |
|---|---|---|
| 6,086,229 A | 7/2000 | Pastrick |
| 6,139,172 A | 10/2000 | Bos et al. |
| 6,149,287 A | 11/2000 | Pastrick et al. |
| 6,152,590 A | 11/2000 | Furst et al. |
| 6,176,602 B1 | 1/2001 | Pastrick et al. |
| 6,276,821 B1 | 8/2001 | Pastrick et al. |
| 6,280,069 B1 | 8/2001 | Pastrick et al. |
| 6,291,905 B1 | 9/2001 | Drummond et al. |
| 6,349,450 B1 | 2/2002 | Koops et al. |
| 6,396,408 B2 | 5/2002 | Drummond et al. |
| 6,416,208 B2 | 7/2002 | Pastrick et al. |
| 6,477,464 B2 | 11/2002 | McCarthy et al. |
| 6,550,103 B2 | 4/2003 | Koops et al. |
| 6,568,839 B1 | 5/2003 | Pastrick et al. |
| 6,907,643 B2 | 6/2005 | Koops et al. |
| 6,977,619 B2 | 12/2005 | March et al. |
| 7,407,203 B2 | 8/2008 | Huizenga et al. |
| 8,333,492 B2 | 12/2012 | Dingman et al. |
| 8,786,401 B2 | 7/2014 | Sobecki et al. |
| 8,801,245 B2 | 8/2014 | De Wind et al. |
| 8,807,807 B2 * | 8/2014 | Wheeler .................. G02B 6/00 362/501 |
| 9,102,266 B2 | 8/2015 | Dingman et al. |
| 10,569,697 B2 | 2/2020 | Huizen et al. |
| 10,632,968 B2 | 4/2020 | De Wind et al. |
| 11,441,338 B2 | 9/2022 | Blank et al. |
| 11,708,035 B2 | 7/2023 | LaCross |
| 2010/0007463 A1 | 1/2010 | Dingman et al. |
| 2010/0088855 A1 | 4/2010 | Ruse et al. |
| 2020/0102773 A1 | 4/2020 | Sobecki |
| 2021/0332619 A1 | 10/2021 | Peterson et al. |
| 2022/0018168 A1 | 1/2022 | Cervone et al. |
| 2022/0282534 A1 | 9/2022 | Peterson et al. |
| 2022/0341226 A1 | 10/2022 | Sobecki et al. |
| 2023/0001849 A1 | 1/2023 | Dingman et al. |
| 2023/0114112 A1 | 4/2023 | Sobecki et al. |
| 2024/0035318 A1 | 2/2024 | Sobecki et al. |

* cited by examiner

VEHICULAR DOOR HANDLE ASSEMBLY

CROSS REFERENCE TO RELATED APPLICATIONS

The present application claims the filing benefits of U.S. provisional application Ser. No. 63/592,594, filed Oct. 24, 2023, and U.S. provisional application Ser. No. 63/584,999, filed Sep. 25, 2023, which are hereby incorporated herein by reference in their entireties.

FIELD OF THE INVENTION

The present invention relates to handles for vehicles and, more particularly, to an exterior handle for opening a side door and/or liftgate of a vehicle.

BACKGROUND OF THE INVENTION

A door handle for a vehicle door typically includes a handle portion that is pivotable relative to a base portion, whereby pivotal movement of the handle portion actuates a latch mechanism to open the door. Typically, a door handle is a pull strap handle with a strap handle portion that protrudes outwardly from the side of the vehicle for grasping by the person opening the door of the vehicle. Alternately, paddle type door handle assemblies are known, where a paddle portion is pivotally mounted to a base portion and is pulled generally outwardly and upwardly to open the vehicle door. Such paddle type door handle assemblies typically protrude outwardly from the vehicle door when in their unpulled state and have an open recess below the paddle portion for receiving a user's fingers for grasping the paddle portion.

SUMMARY OF THE INVENTION

A vehicular exterior door handle assembly includes a base portion configured to mount at a door of a vehicle equipped with the door handle assembly. A handle portion includes a grasping portion and the handle portion is movable relative to the base portion between (i) a recessed position, where the grasping portion of the handle portion is recessed at the base portion and is not graspable by a user, and (ii) an extended position, where the grasping portion of the handle portion protrudes outward from the base portion and is graspable by the user. A light module is electrically operable to emit light. With the base portion mounted at the door, the light module is disposed between the base portion and an outer panel of the door at or near a cutout region of the outer panel of the door. With the handle portion in the extended position, the handle portion extends at least partially through the cutout region of the outer panel of the door. When the light module is electrically operated to emit light, the light module emits light that emanates from between the base portion and the outer panel of the door and through the cutout region of the outer panel of the door to illuminate the handle portion.

For example, the light module includes a bracket with a cutout region that substantially aligns with the cutout region of the door panel, and the bracket accommodates a light pipe that at least partially circumscribes the cutout region and a light source that is electrically operable to emit light to illuminate the light pipe. The light pipe may comprise a substantially U-shaped light pipe with a first leg or portion that extends above the cutout region and a second leg or portion that extends below the cutout region. Light sources or emitters may be disposed at the respective ends of the light pipe to provide even illumination along the light pipe. Thus, the light module provides perimeter back lighting for the handle portion so that a user may ascertain the location of the door handle region and view the handle portion while grasping the handle portion to open the vehicle door.

Optionally, a vehicular exterior or interior door handle assembly includes a base portion configured to mount at a door of a vehicle equipped with the door handle assembly. A handle portion includes a grasping portion and the handle portion is movable relative to the base portion between (i) a recessed position, where the grasping portion of the handle portion is recessed at the base portion and is not graspable by a user, and (ii) an extended position, where the grasping portion of the handle portion protrudes outward from the base portion and is graspable by the user. The handle portion includes (i) one or more slider elements that are laterally movable relative to the base portion to move the handle portion between the recessed position and the extended position and (ii) a flexible cover element that is coupled to the one or more slider elements and that flexes relative to the base portion to accommodate movement of the slider elements as the slider elements moves the handle portion between the recessed position and the extended position. The flexible cover element is graspable by the user when the handle portion is in the extended position. An actuator includes an electrically operable motor and is operable to move the handle portion between the recessed position and the extended position. The actuator imparts rotational movement of a cam shaft relative to the base portion. As the cam shaft rotates relative to the base portion, one or more cams rotate with the cam shaft and engage the slider elements, and the slider elements move laterally relative to the base portion according to rotation of the corresponding cams to move the handle portion between the recessed position and the extended position.

These and other objects, advantages, purposes and features of the present invention will become apparent upon review of the following specification in conjunction with the drawings.

DESCRIPTION OF THE PREFERRED EMBODIMENTS

Figure 1:
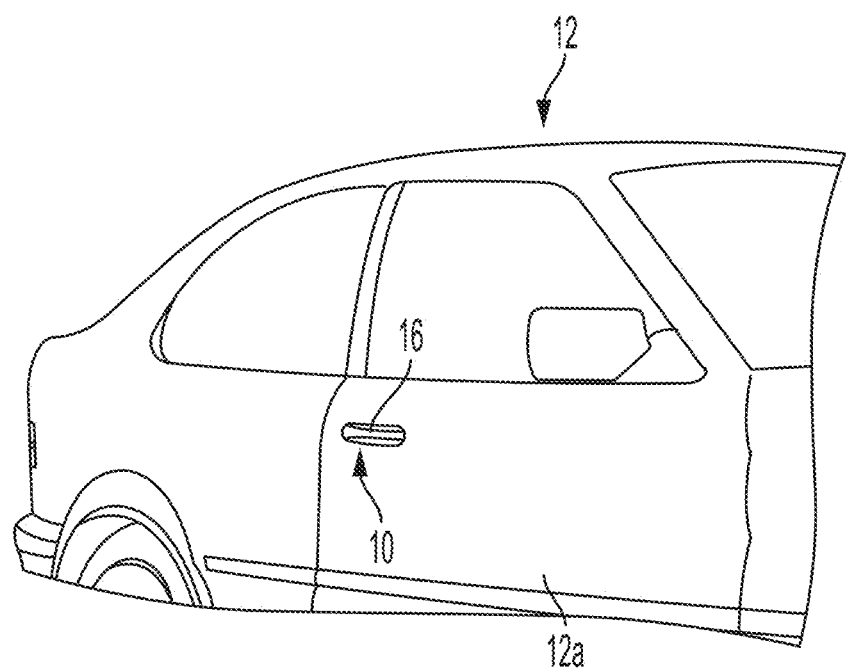
FIG. 1 is a perspective view of a vehicle equipped with a door handle assembly.
Figure 2:
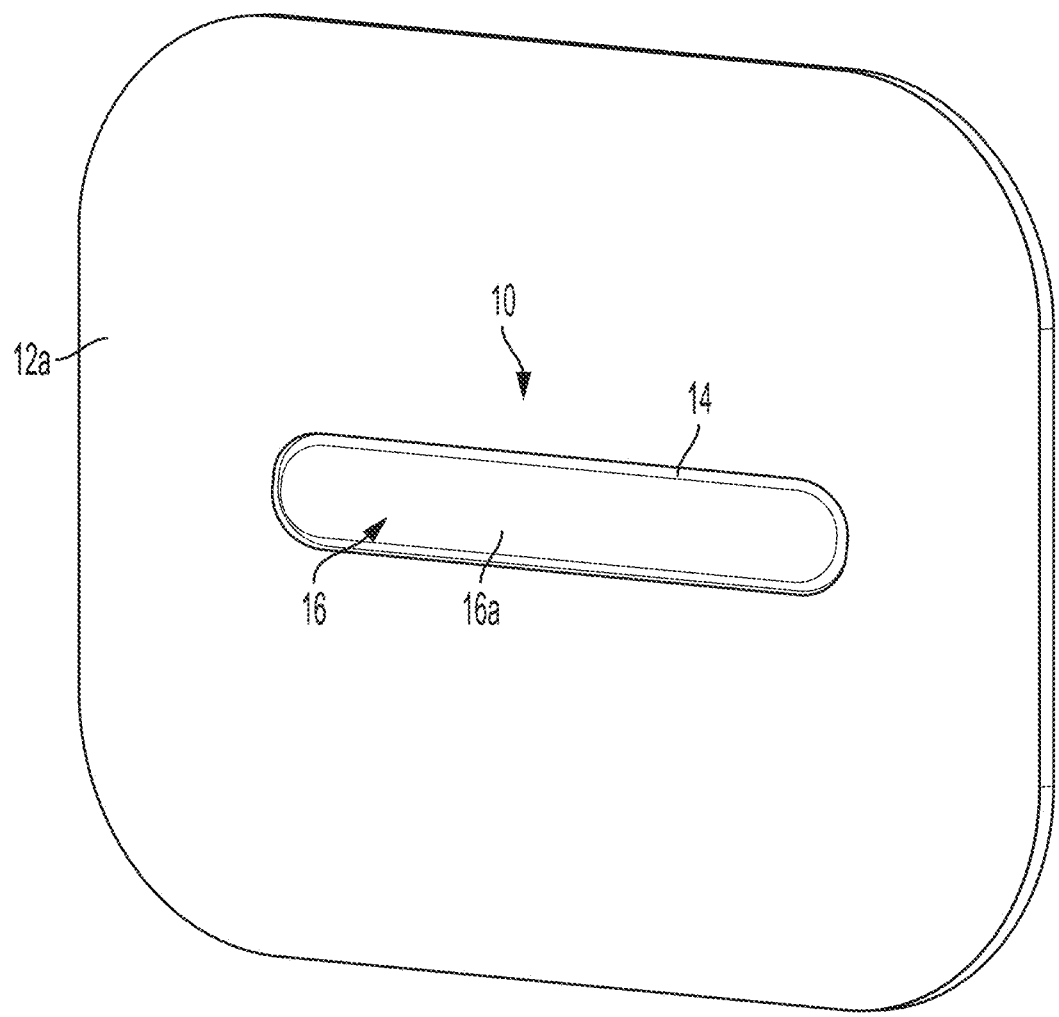
FIG. 2 is a perspective view of the door handle assembly at the vehicle door, with the door handle in its flush or non-use or recessed position.
Figure 3:
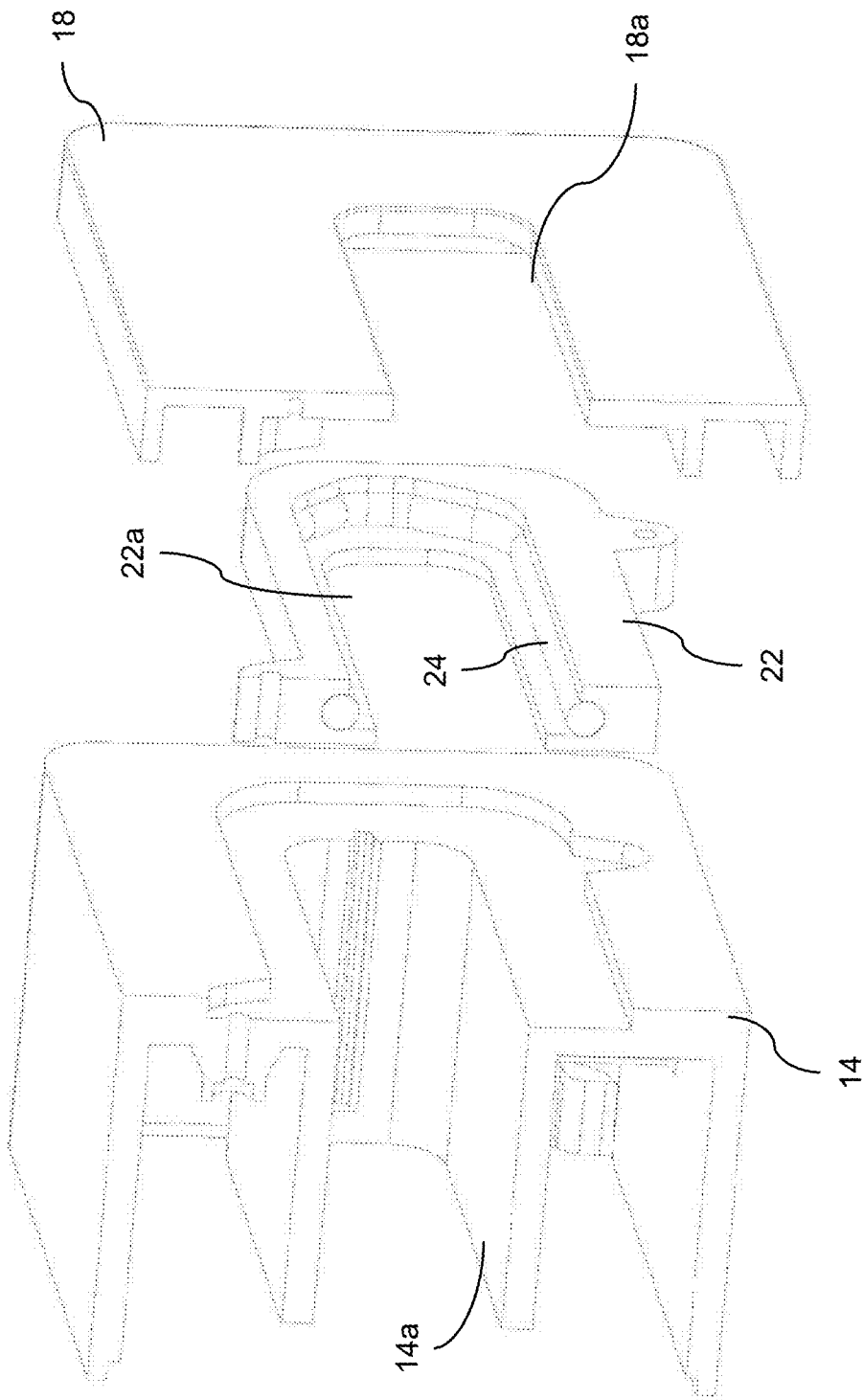
FIG. 3 is an exploded view of a base portion of the door handle assembly, a light module assembly and a door panel of the vehicle door.
Figure 4:
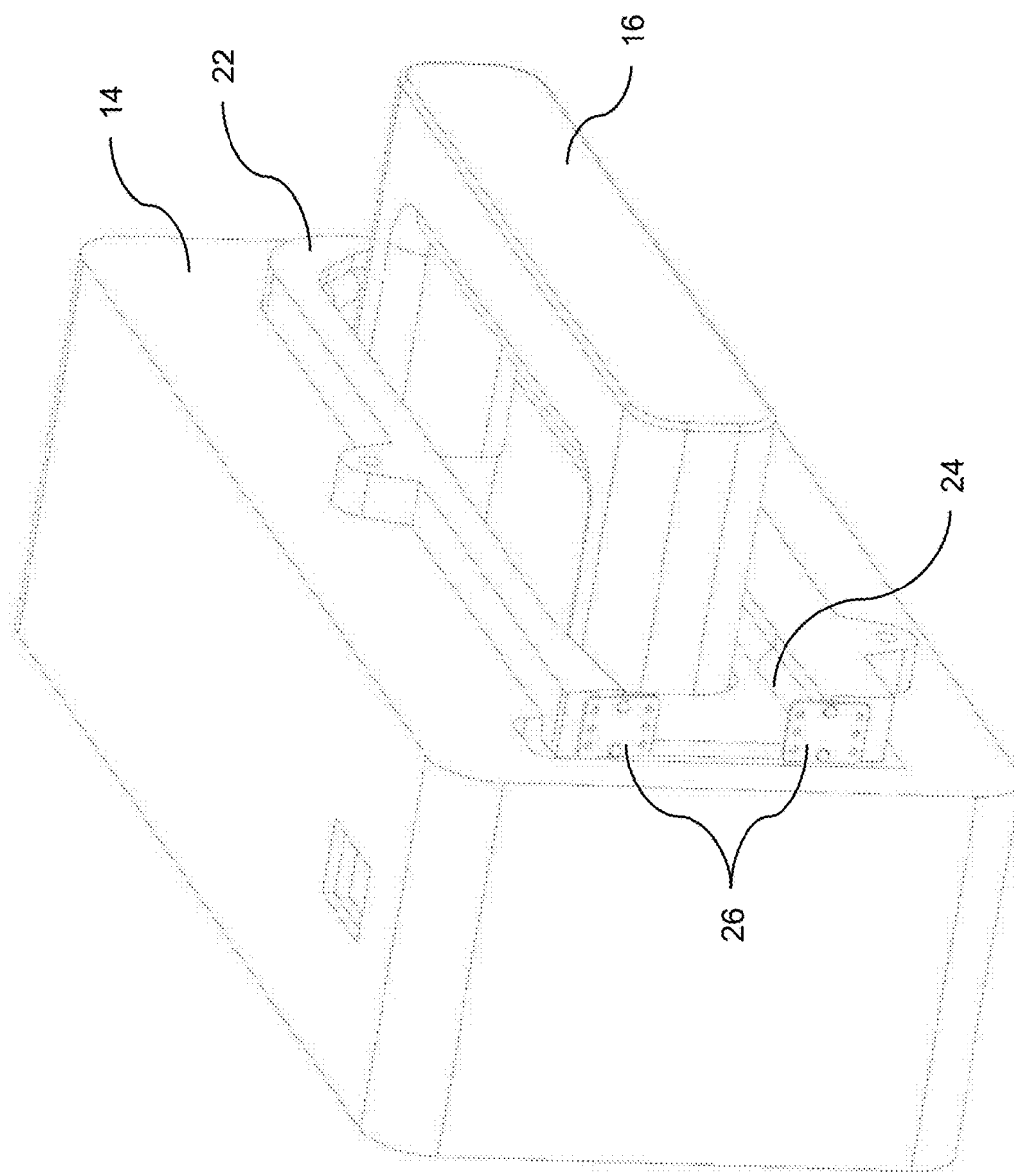
FIG. 4 is a perspective view of the door handle assembly and light module assembly, with the door handle in its extended or use position.

Referring now to the drawings and the illustrative embodiments depicted therein, a vehicle door handle assembly 10 is mountable to a door 12a of a vehicle 12 and operable to release a latch mechanism (not shown) of the door 12a to open the vehicle door (FIG. 1). The vehicle door handle assembly 10 includes a base portion or bracket 14 that is mountable to the vehicle door 12a and a handle or strap portion 16 that is movably or pivotally mounted to the bracket 14 (FIG. 2). The handle portion 16 may be manually moved or pivoted relative to the bracket 14 (such as via pulling by a user) to actuate a bellcrank at the base portion 14, which in turn actuates or releases the latch mechanism of the door to open the vehicle door. When not in use, the handle portion 16 is at an initial rest or recessed or non-use position and is received or disposed at or partially in the base portion 14 so that an outer surface 16a of the handle portion 16 is generally flush with or generally coplanar with (or protruding only slightly from or recessed slightly in) the outer surface 14a of the base portion 14 or the door panel 12a, whereby the handle portion 16 is not readily usable or graspable by a user. The handle portion 16 may be manually or electromechanically pivotable or movable or laterally movable relative to the door and the base portion 14 to move to its extended or ready or operational or grippable or graspable or person-operable position and is then graspable or grippable by a user where the handle portion 16 may be manually moved (such as via pulling by the user) further beyond the extended position to actuate or release the latch mechanism of the door to open the vehicle door. For example, the handle assembly 10 may include an electrically operable or electromechanical actuator at the base portion 14 for imparting the pivotal movement of the handle portion 16 relative to the base portion 14 (such as automatically imparting such handle movement in response to a signal from a key fob or a passive entry system or the like) so that the handle portion 16 is automatically moved from its recessed position to its ready or graspable position where a user can grasp the handle portion to pull or move the handle portion for unlatching and/or opening the vehicle door and/or the like.

The handle assembly 10 may comprise any suitable type of handle assembly, and may include or incorporate aspects of the door handle assemblies described in U.S. Pat. Nos. 8,786,401; 6,977,619; 7,407,203; 6,349,450; 6,550,103; 6,907,643; 8,801,245 and/or 8,333,492, and/or U.S. Publication Nos. US-2024-0035318; US-2022-0018168; US-2022-0282534; US-2022-0341226; US-2010-0088855; US-2010-0007463 and/or US-2020/0102773, which are all hereby incorporated herein by reference in their entireties. Although shown as a strap type handle, the handle assembly may comprise any suitable type of vehicle door handle assembly, such as a paddle type vehicle door handle assembly (having a paddle or the like that may be pulled at to open the vehicle door) or other type of vehicle door handle assembly. Furthermore, aspects of the handle assembly 10 may be suitable for use with a liftgate handle assembly for a liftgate or tailgate of a vehicle.

Optionally, the door handle assembly may include a light module or lighting element, such as for illuminating the door handle portion or the inner portion of the door handle portion, so that the user can readily see and discern the door handle when approaching the vehicle in low lighting conditions. In some examples, the lighting element may comprise a strip light or pocket light or the like, and the door handle assembly may include a ground illumination light and/or other light or lighting element, such as a projection light or the like, such as by utilizing aspects of the door handle assemblies and lighting systems described in U.S. Pat. Nos. 11,441,338; 10,632,968; 10,569,697; 9,102,266; 8,786,401; 8,801,245; 5,371,659; 5,497,305; 5,669,699; 5,823,654; 6,349,450; and/or 6,550,103, and/or U.S. Patent Pub. Nos. US-2023-0114112; US-2023-0001849 and/or US-2021-0332619, which are all hereby incorporated herein by reference in their entireties.

Typically, the light module is disposed at the movable handle portion 16. However, when the user grasps the handle portion 16, the lighting effect may be disrupted or blocked by the user's hand. Further, a light module integrated into the movable handle increases the handle's size and interior complexity, leading to increased costs and material usage. Moreover, with the light module disposed at the movable handle portion 16, the wire harness electrically connecting between the light module and the power source of the vehicle exits the handle and must be able to move, pull and flex within the door handle bracket to accommodate movement of the handle portion, which may lead to unwanted contact with other parts of the handle assembly. In other words, when the lighting module is placed inside of the movable portion of the door handle, the user's hand may disrupt the lighting effect. That is, when the user places their hand around the handle, the lighting may be blocked.

Referring to FIGS. 3-6, a light module 20 is disposed at or near the handle assembly 10 and electrically operable to emit light to illuminate the door handle region at the door 12a of the vehicle 12. The light module 20 is disposed between the base portion 14 of the handle assembly 10 and the outer door panel or sheet metal 18 of the door 12a and substantially circumscribes the recess 14a of the base portion 14 at which the handle portion 16 is movably or pivotably mounted. In other words, the light module 20 substantially circumscribes or surrounds the handle portion 16 so that, when the handle portion 16 is moved between the recessed position and the extended position, the handle portion 16 moves relative to the base portion 14 and the light module 20, and the light module 20 provides perimeter lighting to illuminate the handle portion 16.

The light module 20 includes a bracket or base portion 22 that mounts at the base portion 14 of the handle assembly 10 and that includes an aperture or through hole or cutout region 22a that substantially aligns with the recess 14a of the handle base portion 14 and an aperture or through hole or cutout region 18a of the door panel 18. The handle portion 16 may extend and retract relative to the base portion 14 and through the cutout region 22a of the light module bracket 22 and the cutout region 18a of the door panel 18.

A light pipe or optical fiber 24 extends along the bracket portion 22 and substantially circumscribes the cutout region 22a and light sources 26, such as light emitting diodes (LEDs), are disposed at respective ends of the light pipe 24 to illuminate the light pipe 24. The light pipe 24 extends along a channel of the bracket portion 22 and may comprise a rigid light pipe 24 molded to a shape that corresponds to the channel of the bracket portion. Optionally, the light pipe 24 may be a flexible component that is flexed to the shape of the channel and held in place by structure of the bracket 22 and/or adhesive or other fasteners.

Figure 5:
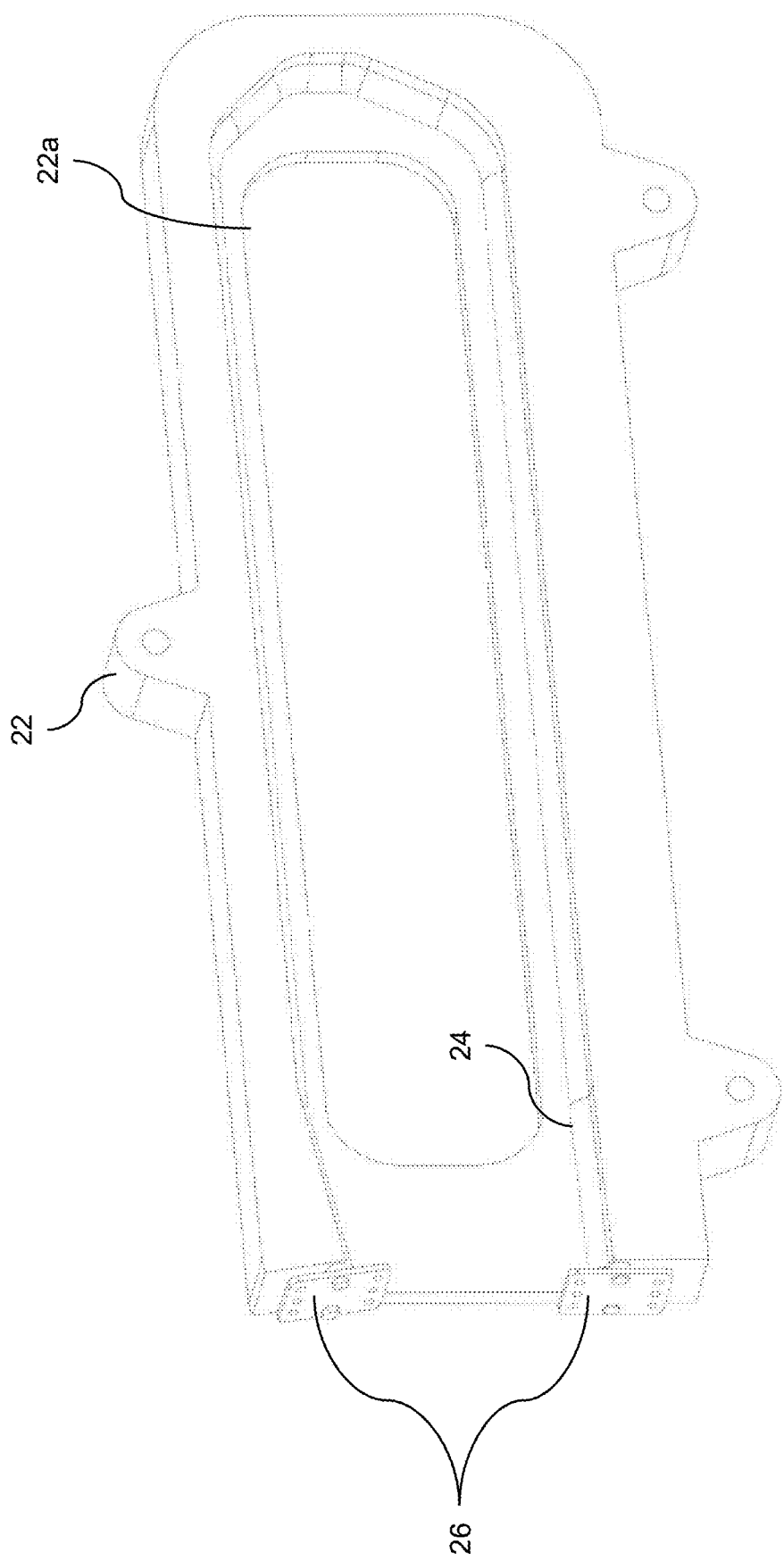
FIG. 5 is a perspective view of the light module assembly.

In the illustrated example, and such as shown in FIG. 5, the light pipe 24 comprises a substantially U-shaped light pipe with an upper leg that extends along the bracket 22 above the cutout region 22a and a lower leg that extends along the bracket 22 below the cutout region 22a, with respective ends of the light pipe 24 at the same side of the bracket 22. The LEDs 26 are attached at the bracket 22 and aligned with (and optionally engaged with) the respective ends of the light pipe 24. As shown, the light module 18 includes two LEDs, with one LED at each respective end of the light pipe 24. However, it should be understood that the light module 18 may include any suitable number of light sources or LEDs, such as one or more, two or more, three or more, four or more, and the like. Thus, when electrically operated to emit light, the LEDs 26 emit light along the light pipe 24 so that the light pipe 24 provides a glowing and consistent illumination along the length of the light pipe 24.

The light emanates from the light pipe 24 and illuminates the handle portion 16. For example, a gap or space may separate the light pipe 24 and the handle portion 16 behind the door panel 18 so that, when the handle portion 16 is in the extended position, light emanates through the cutout region 18a of the door panel 18 to illuminate the handle portion 16. Further, a gap or space may separate the handle portion 16 and the door panel 18 so that, when the handle portion is in the recessed position, light emanates through the gap or space to illuminate the door handle region and alert a user as to the position of the door handle.

Figure 6:
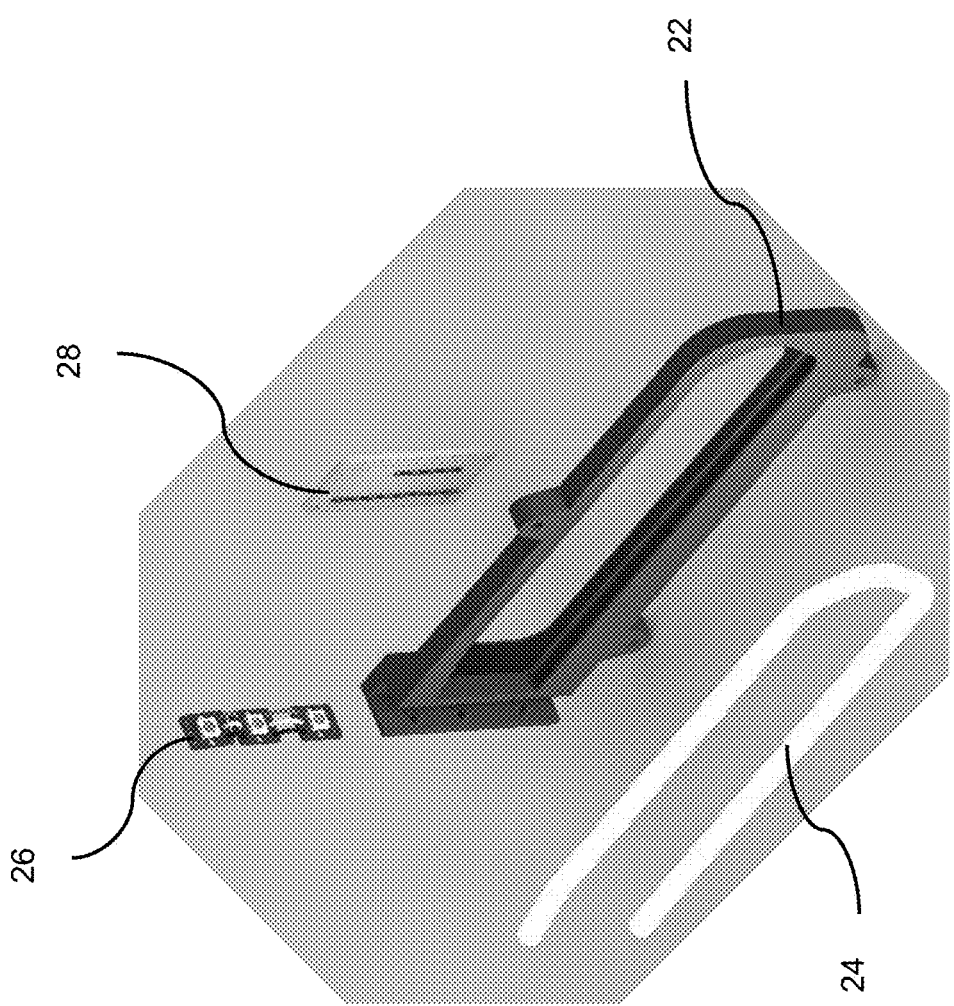
FIG. 6 is an exploded view of the light module assembly.

A printed circuit board (PCB) 28 may be disposed remote from the bracket 22 or at the bracket 22 and includes electronic circuitry and associated software for controlling operation of the light module 18 (FIG. 6). Because the light module 18 does not move when the handle portion 16 is moved between the recessed and extended positions, the wiring harness between the PCB 28 and the light module 18 may be fixed and electrical connection between the PCB 28 wiring harness of the vehicle may be fixed, reducing or eliminating potential inadvertent contact between the wiring and other components of the handle assembly.

Further, the light module 18 includes a gasket or sealing element to preclude entrance of moisture and/or contaminants into the light module 18 and the handle assembly 10. For example, the gasket or sealing element may include a substantially clear or light transmissive sealant or epoxy that circumscribes the light pipe and/or handle portion. Optionally, the sealing element may comprise a potting material disposed at and around and encasing the circuit board(s) and light emitters and circuitry.

Figure 7:
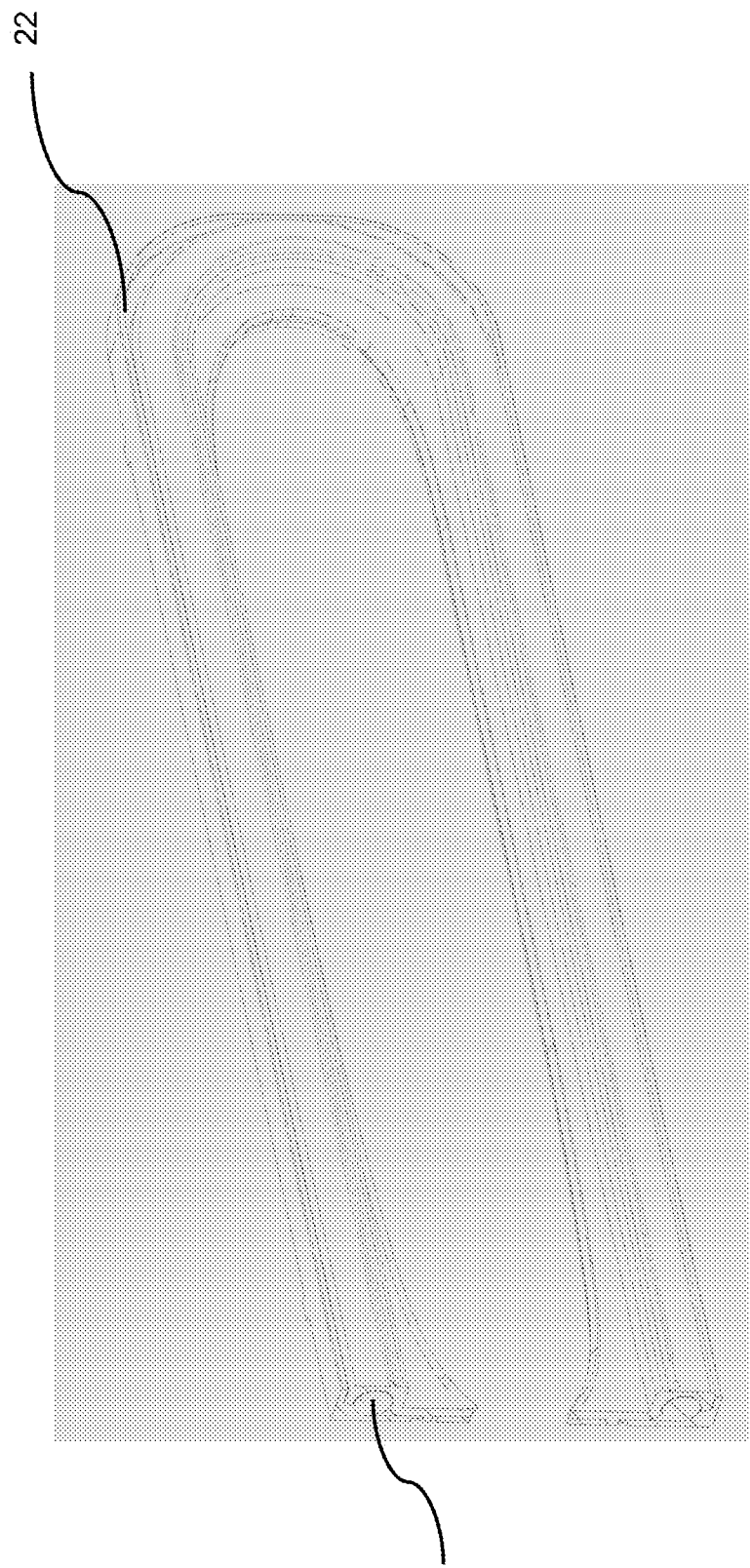
FIG. 7 is a perspective view of a light module assembly having a two-piece bracket.
Figure 8:
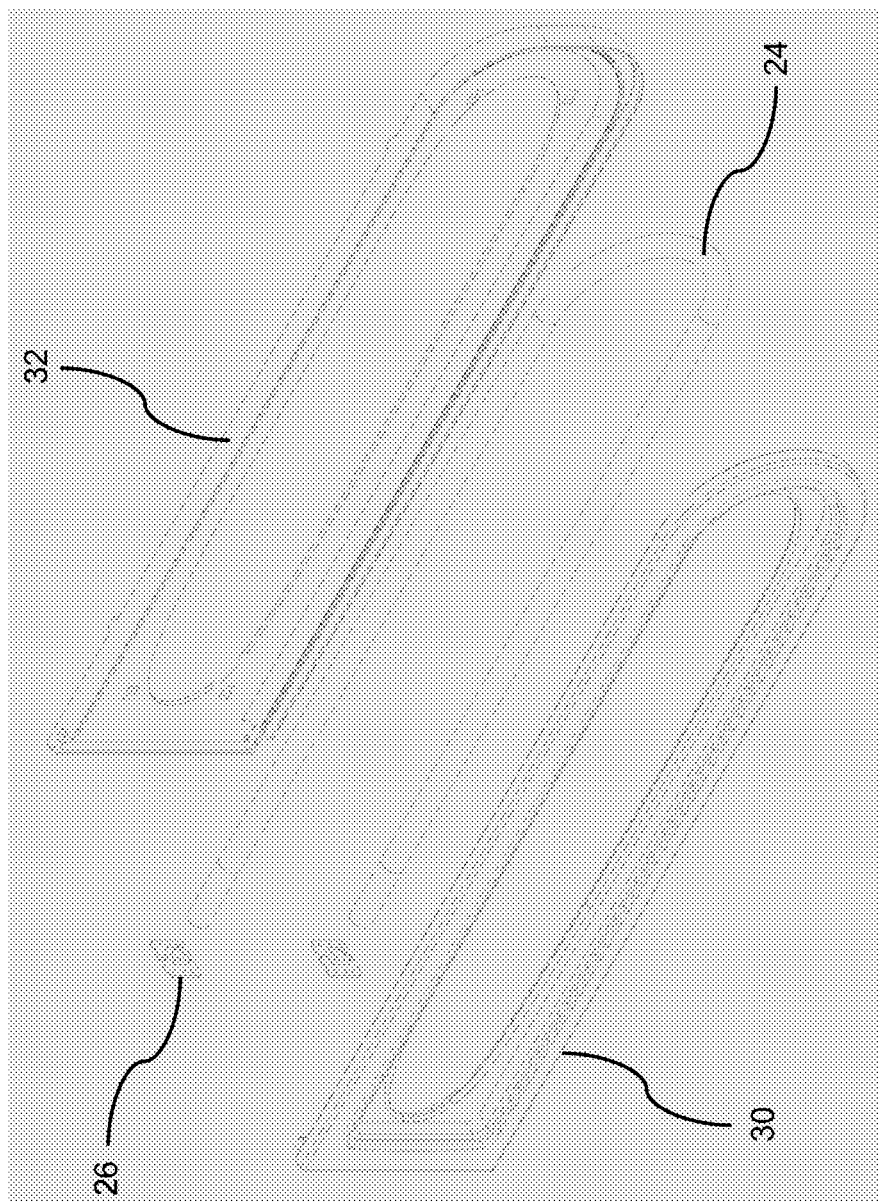
FIG. 8 is an exploded view of the light module assembly having the two-piece bracket.

Optionally, the bracket 22 may include a one-piece bracket having a channel or recess circumscribing the cutout region 22a for receiving the light pipe 24 (FIG. 6). In some examples, the bracket includes a first portion or outer portion 30 and a second portion or inner portion 32 that join together to accommodate the light pipe 24 and/or LEDs 26 between the first portion 30 and the second portion 32 (FIGS. 7 and 8). For example, the first portion 30 and the second portion 32 may snap attach to one another when joined together, or the first portion 30 and the second portion 32 may be adhesively attached to one another or joined via any suitable fastener.

Thus, the light module 18 is disposed between the handle base portion 14 and the door panel 18 and substantially circumscribes the handle portion 16 to provide illumination at a perimeter of the door handle region. Because the light module is disposed around and/or behind the handle portion 16, the illumination is not blocked when the user grasps the handle portion 16. When operated, the light module 18 provides backlighting to illuminate the handle portion 16, such as to indicate the location of the door handle and/or allow the user to view the handle portion 16 in low light conditions. Optionally, the light module 18 is automatically operated in response to the door handle being extended and/or the door being unlocked, such as via an input at a keyfob or remote entry system of the vehicle.

Optionally, operation of the light sources 26 may be adjusted to adjust a color of the illumination provided by the light module 18. For example, the color of light emitted by the light sources 26 may be customizable by the user, such as via an input at an interior portion of the vehicle. Optionally, the light sources 26 emit a first color (e.g., white or red light) when the door 12a is locked and the light sources 26 emit a second color (e.g., green light) when the door 12a is unlocked.

Optionally, the light module may include more than one light pipe with LEDs disposed at respective ends of each light pipe. For example, the light module may include a first light pipe extending along the bracket and along a first or upper edge of the cutout region, a second light pipe extending along the bracket and along a second or lower edge of the cutout region, a third light pipe extending along the bracket and along a first side edge of the cutout region, and a fourth light pipe extending along the bracket and along an opposite second side edge of the cutout region. Thus, the plurality of light pipes cooperate to substantially circumscribe the handle portion 16. Optionally, the light module may include individual light sources (e.g., LEDs) disposed at the bracket 22 and substantially surrounding the cutout region 22a of the bracket to directly provide the perimeter lighting.

In other words, a set of LEDs emit light through a light pipe (either flexible or molded) to provide a glow around the exterior door handle. The light module provides an aesthetically pleasing back glow to the user when the handle presents itself. The lighting module is placed between the door sheet metal and mounting bracket of the door handle. This ensures that the user's hand does not disrupt the lighting effect while using the handle. This also reduces the movable handle's complexity and allows for easier integration into different handle platforms.

The lighting module includes a bracket, a light pipe (such as a molded or flexible light pipe component held into shape by the bracket), two or more LEDs, and a sealing gasket. The ends of the light pipe are placed flush against an LED (one per end). This ensures even lighting throughout the length of the light pipe. The bracket encases the LED and light pipe assembly to provide protection against environmental conditions and mounting points to the door handle bracket and structure for the LEDs and light pipe assembly. The gasket protects against environmental ingress in both the extended and retracted door handle positions. Power and control of the LEDs may be performed by a separate controller board that is placed remote from the lighting module.

Removing the light module from the movable portion of the handle ensures that the user's hand does not encompass the lighting module, leaving the lighting effect unobstructed. Further, the separate light module reduces the handle size and complexity by not requiring the handle assembly to accommodate the lighting module and allows for the power and control cables to be rigidly fixed within the bracket, eliminating the possibility of unwanted contact with other components.

Figure 9:
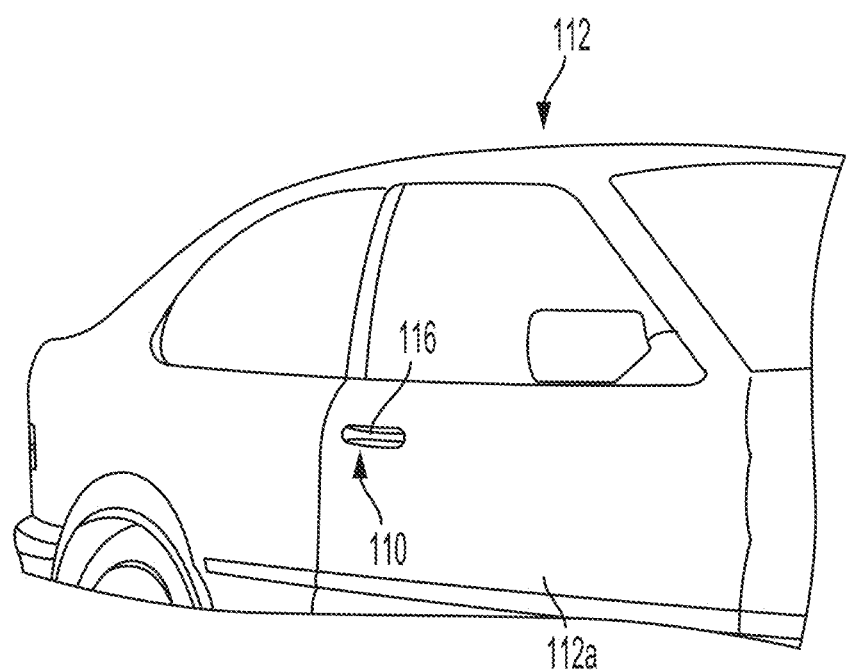
FIG. 9 is a perspective view of a vehicle equipped with another door handle assembly.
Figure 10:
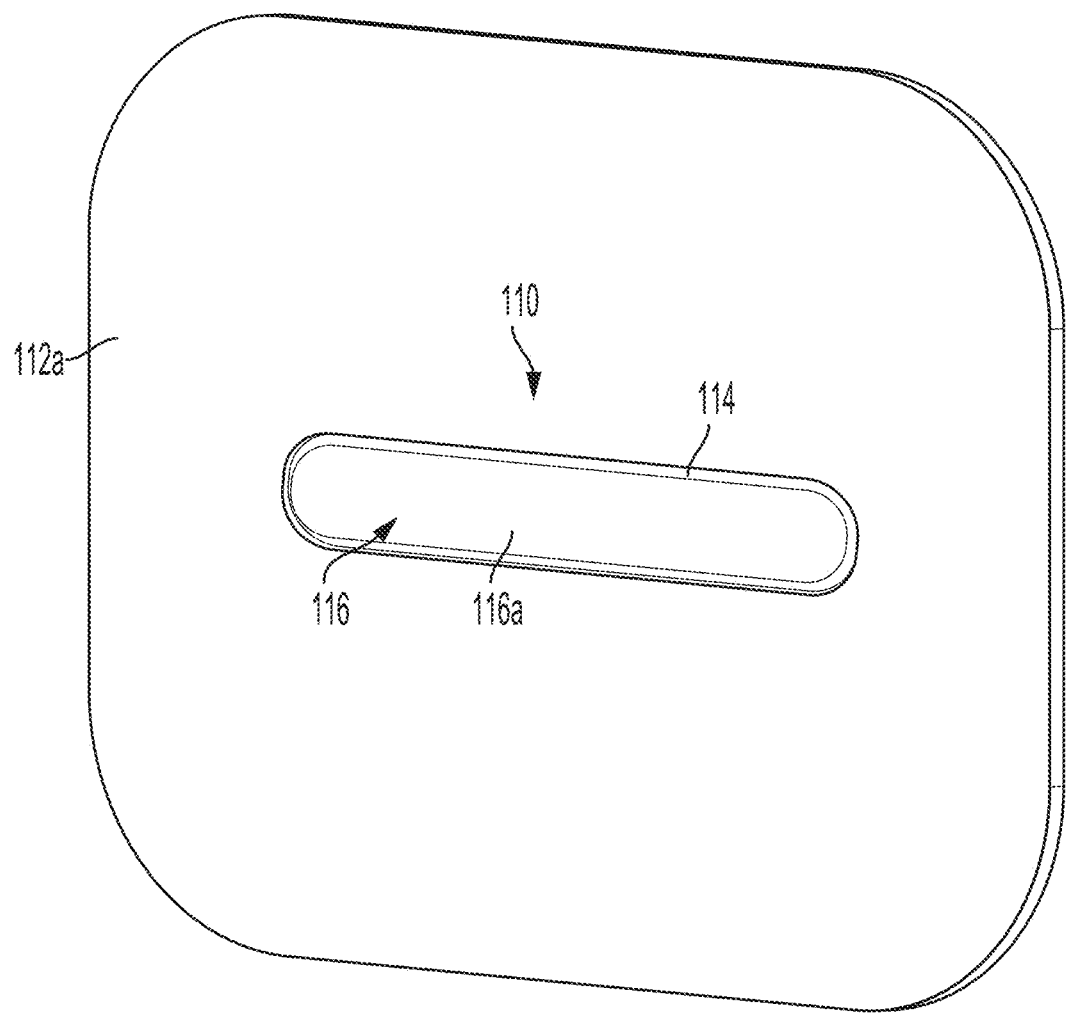
FIG. 10 is a perspective view of the door handle assembly of FIG. 9 at the vehicle door, with the handle portion in its flush or non-use or recessed position.
Figure 11:
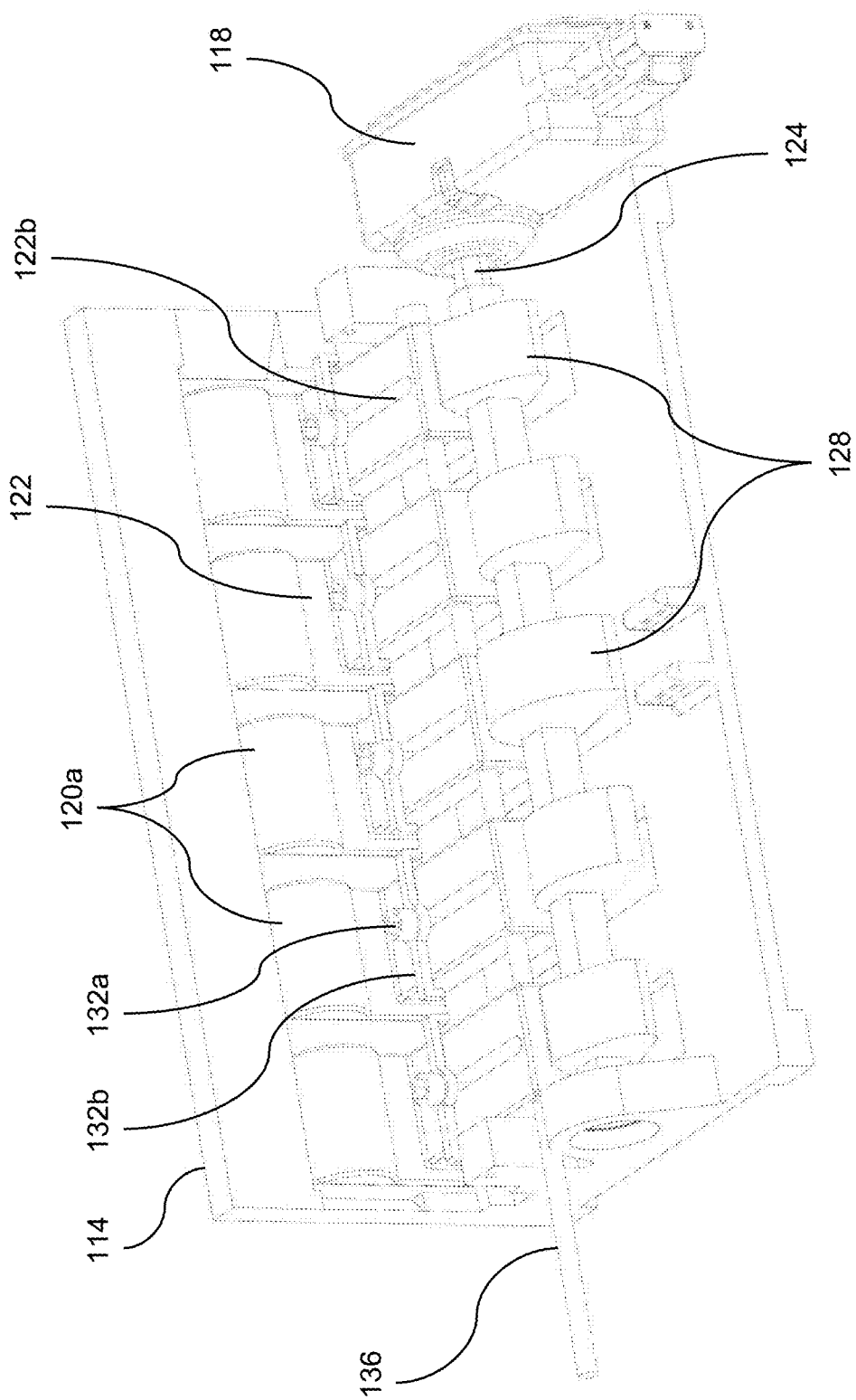
FIG. 11 is a perspective view of the door handle assembly of FIG. 9.

Optionally, the door handle assembly includes a grasping portion that is flush with the outer surface of the door in a retracted position and that extends from the door for grasping by a user in an extended position, where the grasping portion is flexible or shapable, such as to provide a pocket for grasping by the user or to provide a button that is compressible by the user. For example, and referring now to FIG. 9-17, a vehicle door handle assembly 110 is mountable to a door 112a of a vehicle 112 and operable to release a latch mechanism (not shown) of the door 112a to open the vehicle door (FIG. 9). The vehicle door handle assembly 110 includes a base portion or bracket 114 that is mountable to the vehicle door 112a and a handle or strap portion 116 that is movably or pivotally mounted to the bracket 114 (FIG. 10). The handle portion 116 may be manually moved or pivoted relative to the bracket 114 (such as via a user pulling the handle portion away from the door or pressing the handle portion toward the door) to actuate a bellcrank at the base portion 114, which in turn actuates or releases the latch mechanism of the door to open the vehicle door. When not in use, the handle portion 116 is at an initial rest or recessed or non-use position and is received or disposed at or partially in the base portion 114 so that an outer surface 116a of the handle portion 116 is generally flush with or generally coplanar with (or protruding only slightly from or recessed slightly in) the outer surface 114a of the base portion 114 or the door panel 112a, whereby the handle portion 116 is not readily usable or graspable by a user. The handle portion 116 may be electromechanically pivotable or movable or laterally movable relative to the door and the base portion 114 to move to its extended or ready or operational or grippable or graspable or person-operable position and is then graspable or grippable by a user where the handle portion 116 may be manually moved from the extended position to actuate or release the latch mechanism of the door to open the vehicle door. For example, the handle assembly 110 may include an electrically operable or electromechanical actuator 118 (FIG. 11) at the base portion 114 for imparting the pivotal movement of the handle portion 116 relative to the base portion 114 (such as automatically imparting such handle movement in response to a signal from a key fob or a passive entry system or the like) so that the handle portion 116 is automatically moved from its recessed position to its ready or graspable position where a user can grasp the handle portion to pull or move the handle portion for unlatching and/or opening the vehicle door and/or the like.

The handle assembly 110 may comprise any suitable type of handle assembly, and may include or incorporate aspects of the door handle assemblies described in U.S. Pat. Nos. 11,708,035; 8,786,401; 6,977,619; 7,407,203; 6,349,450; 6,550,103; 6,907,643; 8,801,245 and/or 8,333,492 and/or U.S. Publication Nos. US-2024-0035318; US-2022-0018168; US-2022-0282534; US-2022-0341226; US-2010-0088855; US-2010-0007463 and/or US-2020/0102773, which are all hereby incorporated herein by reference in their entireties. For example, the handle assembly 110 may be disposed at the exterior side of the vehicle door for use by a user to open the door and enter the vehicle or the handle assembly 110 may be disposed at the interior side of the vehicle door for use by a user to open the door and exit the vehicle. Aspects of the handle assembly 110 may be suitable for use with a liftgate handle assembly for a liftgate or tailgate of a vehicle.

Referring to FIGS. 11-17, the handle assembly 110 includes a handle portion 116 that is movable relative to the base portion 114 between the recessed position, where the handle portion 116 is flush with or slightly recessed from or slightly extending from the base portion, and an extended position, where the handle portion 116 is laterally moved from the base portion 114 and away from the vehicle door. When in the extended position, the handle portion 116 presents a pocket or grasping portion that is graspable by the user to move the handle portion 116 beyond the extended position to release the latch mechanism of the door. Optionally, the handle portion 116 provides an actuatable button for the user to engage and press to release the latch mechanism. For example, when the handle portion 116 is extended from the base portion 114 and engaged by the user to at least partially compress or move the handle portion 116 toward the base portion 114 and its recessed position, the latch mechanism of the door is actuated to release the latch and allow the door to be opened by the user.

The handle portion 116 includes a flexible sheet or cover 120 made from a malleable and/or elastic material, such as a rubber, leather, woven fabric and the like, that extends over and along one or more movable sliders or followers 122 (such as three or more sliders, five or more sliders, and the like). When the actuator 118 is operated to move the handle portion 116 between the recessed position and the extended position, the sliders 122 move laterally relative to the base portion 114 and the flexible cover 120 conforms to the shape or profile of the sliders 122 to extend and retract the outer surface of the handle portion 116 relative to the base portion 114. The sliders 122 may cooperate to form a continuous and adjustable surface, with the appearance and position of the cover 120 changing according to the configuration of the sliders 122. For example, the flexible cover 120 may be adhered to an outer surface of the sliders 122 and/or respective tabs or flaps 120a of the cover 120 may extend over and/or under the sliders 122 and attach to portions of the sliders 122 behind the base portion 114 to protect the sliders 122 when the handle portion 116 is in the extended position and prevent or preclude entrance of moisture and/or contaminants behind the cover 120. The sliders 122 may be independently movable relative to the base portion 114 and thus may be separately moved to adjust the shape or profile of the flexible cover 120 along the outer surfaces of the sliders 122. Optionally, any combination of one or more of the sliders 122 may be moved together, or the sliders 122 may be moved in a sequence or pattern, such as to create the appearance of a wave or ripple or gradual extension/retraction of the handle portion 116.

When the actuator 118 is operated to move the handle portion 116 between the retracted position and the extended position, an electrically operable motor of the actuator 118 imparts rotation of a cam shaft 124 relative to the base portion 114. A first end of the cam shaft 124 may be coupled to the motor of the actuator 118 and a bearing 126 may be disposed at a second end of the cam shaft 124 opposite the first end. The bearing 126 is disposed at the base portion 114 to allow the cam shaft 124 to rotate relative to the base portion 114 when the actuator 118 is electrically operated.

Figure 12:
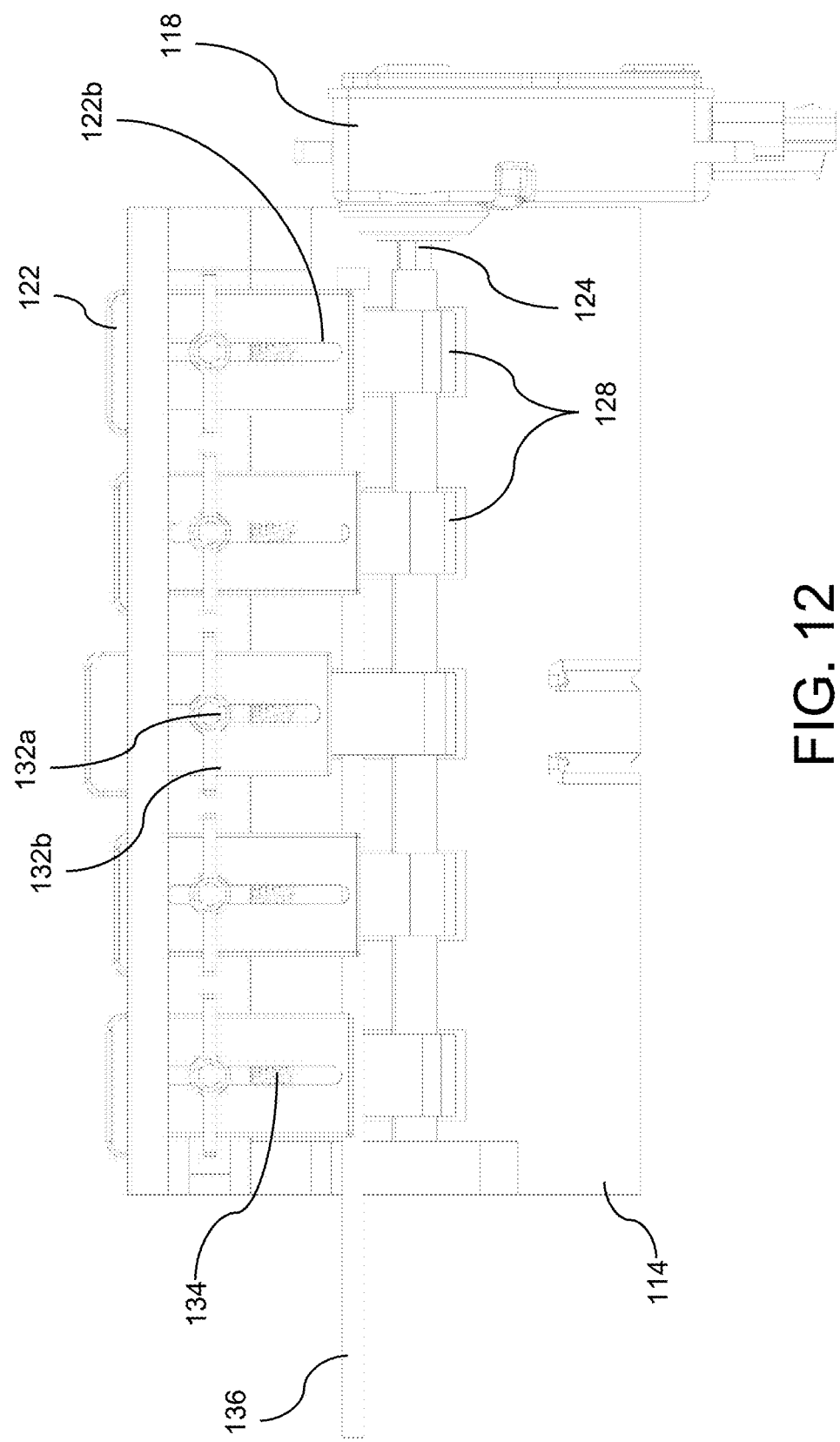
FIG. 12 is a plan view of the door handle assembly of FIG. 9, with the sliders retracted relative to the base portion to position the handle portion in the recessed position.
Figure 13:
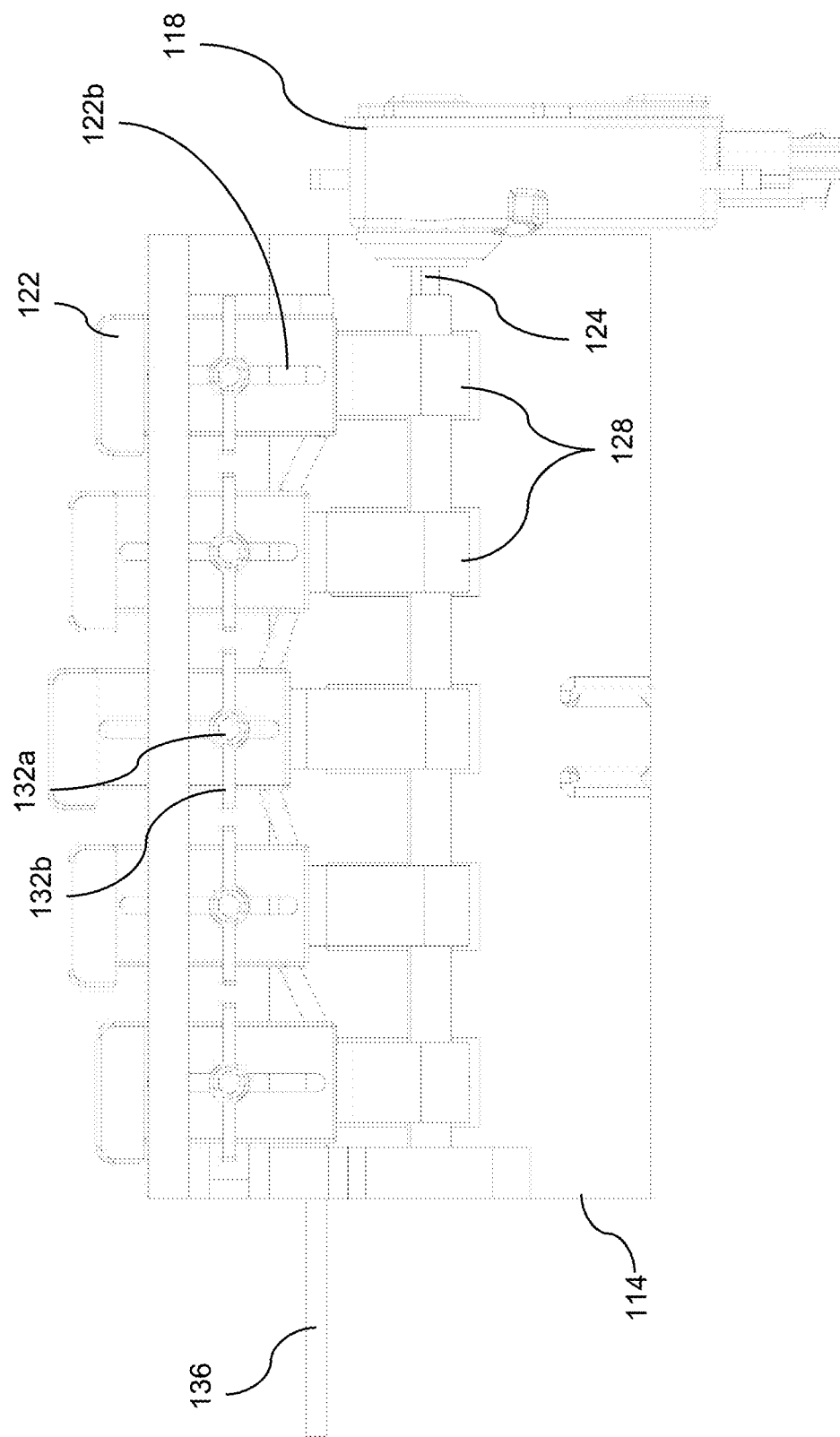
FIG. 13 is a plan view of the door handle assembly of FIG. 9, with the sliders extended relative to the base portion to position the handle portion in its extended or graspable position.
Figure 14:
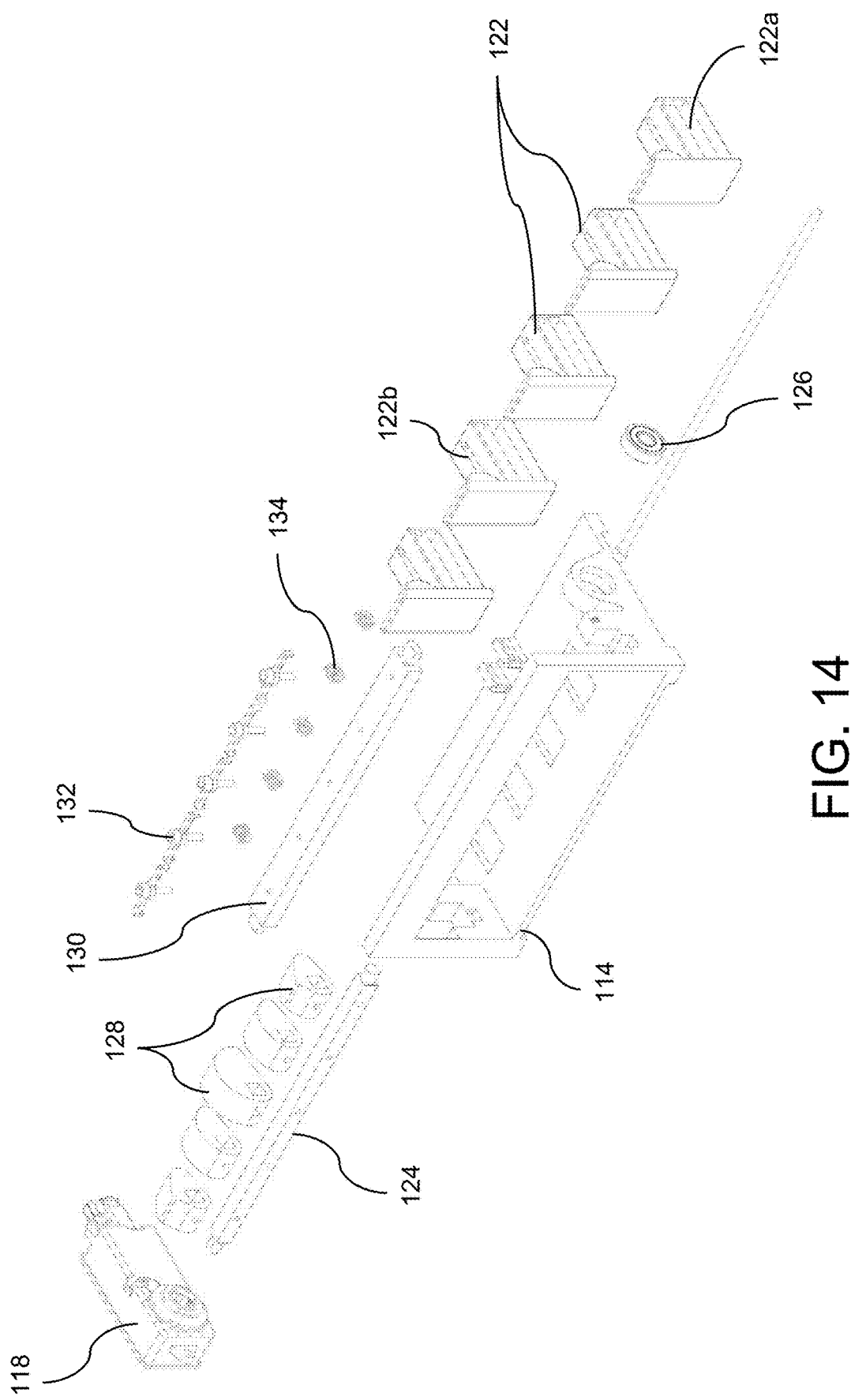
FIG. 14 is an exploded view of the door handle assembly of FIG. 9.
Figure 15:
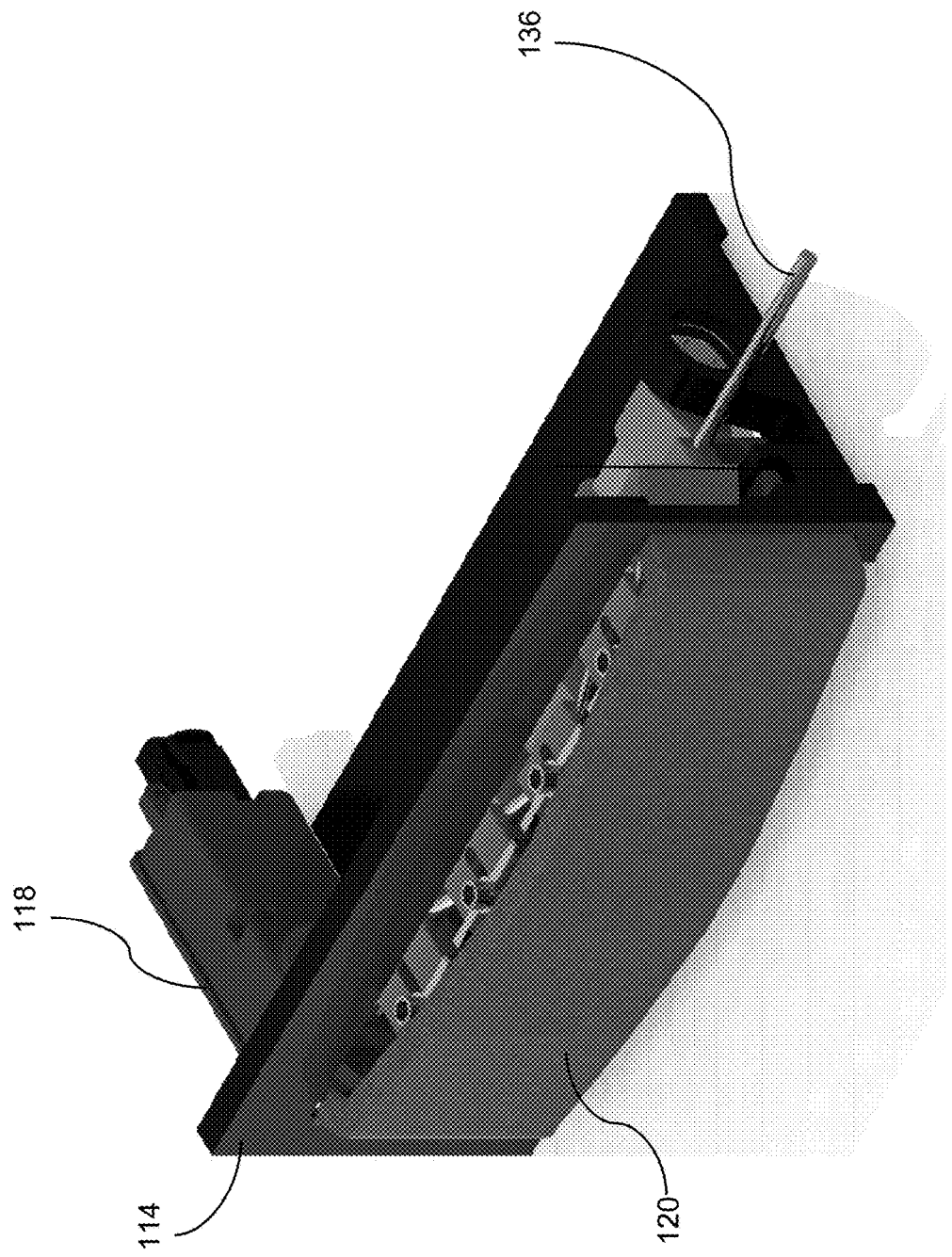
FIGS. 15 and 16 are additional perspective views of the door handle assembly of FIG. 9.

Cams 128 are disposed along the cam shaft 124 and aligned with corresponding sliders 122 so that, when the cam shaft 124 is rotated, the cams 128 rotate with the cam shaft 124 and lobes of the cams 128 engage the sliders 122 to move the sliders 122 relative to the base portion 114 according to rotation of the cams 128. The size and/or shape or profile of the lobe of each cam 128 is configured to move the slider 122 a corresponding distance relative to the base portion 114. For example, and as shown in FIGS. 13 and 15, a cam 128 having a larger lobe may be disposed at a central portion of the cam shaft 124 and configured to move a corresponding slider 122 at a central portion of the cover 120 and cams 128 having smaller lobes may be disposed at end portions of the cam shaft 124 and configured to move corresponding sliders 122 at end portions of the cover 120. Thus, when the cam shaft 124 is rotated so that the lobes of the cams 128 engage the sliders 122, the slider 122 at the central portion of the cover 120 may extend the central portion of the cover 120 further from the base portion 114 than the sliders 122 at the end portions of the cover 120, providing the appearance that the cover 120 is convex or bulb or arcuately shaped when in the extended position. The sliders 122 may be biased toward engagement with the cams 128 so that, when the lobes of the cams 128 are not engaging the sliders 122, the sliders 122 maintain a substantially uniform depth along the length of the cover 120, providing the appearance that the cover 120 is substantially flat and/or flush or slightly extended or recessed from the surface of the door (FIG. 12).

Each slider 122 includes a transverse slot 122*a* extending through the slider 122 and between opposing side surfaces of the slider 122 and an upper slot 122*b* extending along a top surface of the slider 122 and downward so as to intersect the transverse slot 122*a*. The transverse slot 122*a* and upper slot 122*b* extend along the slider 122 parallel to an axis of movement of the slider 122 relative to the base portion 114. A follower bar 130 extends through the transverse slot 122*a* of each slider 122 and is fixed relative to the base portion 114 so that, as the sliders 122 move relative to the base portion 114 and the follower bar 130, the follower bar 130 rides along the transverse slots 122*a* of the sliders 122 and constrains movement of the sliders 122 along the axis of movement.

Respective guide pins or slider pins 132 extend through the upper slot 122*b* of each slider 122 and are fixed relative to the base portion 114 (and optionally attached to the follower bar 130 within the respective slider 122). The guide pins 132 include a button head screw portion 132*a* with a head of the screw portion 132*a* at an upper surface of the slider 122 and the pin portion or threaded portion of the screw portion 132*a* extending through the upper slot 122*b* and optionally engaging the follower bar 130. A guide portion 132*b* of the guide pin 132 is disposed between the head of the screw portion 132*a* and the upper surface of the slider 122 and includes arms or guides extending laterally along the upper surface of the slider 122 and optionally at least partially along the opposing side surfaces of the slider 122. When the slider 122 moves relative to the base portion 114 and the guide pins 132, the guide pins 132 ride along the upper slot 122*b* of the slider 122 and the slider 122 rides between the arms of the guide portion 132*b* of the guide pin 132.

A biasing element 134, such as a coil spring, is disposed within each slider 122 between the guide pin 132 and a rear internal surface of the slider 122 to bias the slider 122 along the axis of movement toward the cams 128. Thus, when the slider 122 is moved to extend the cover 120 relative to the base portion 114, the biasing element 134 is compressed between the guide pin 132 and the internal surface of the slider 122. As the cam shaft 124 and cams 128 rotate to move the handle portion 116 toward the recessed position, the biasing element 134 expands and urges the sliders 122 toward engagement with the cams 128 so that the sliders 122 move back in toward the base portion 114, allowing the cover 120 to move toward the recessed position.

Figure 16:
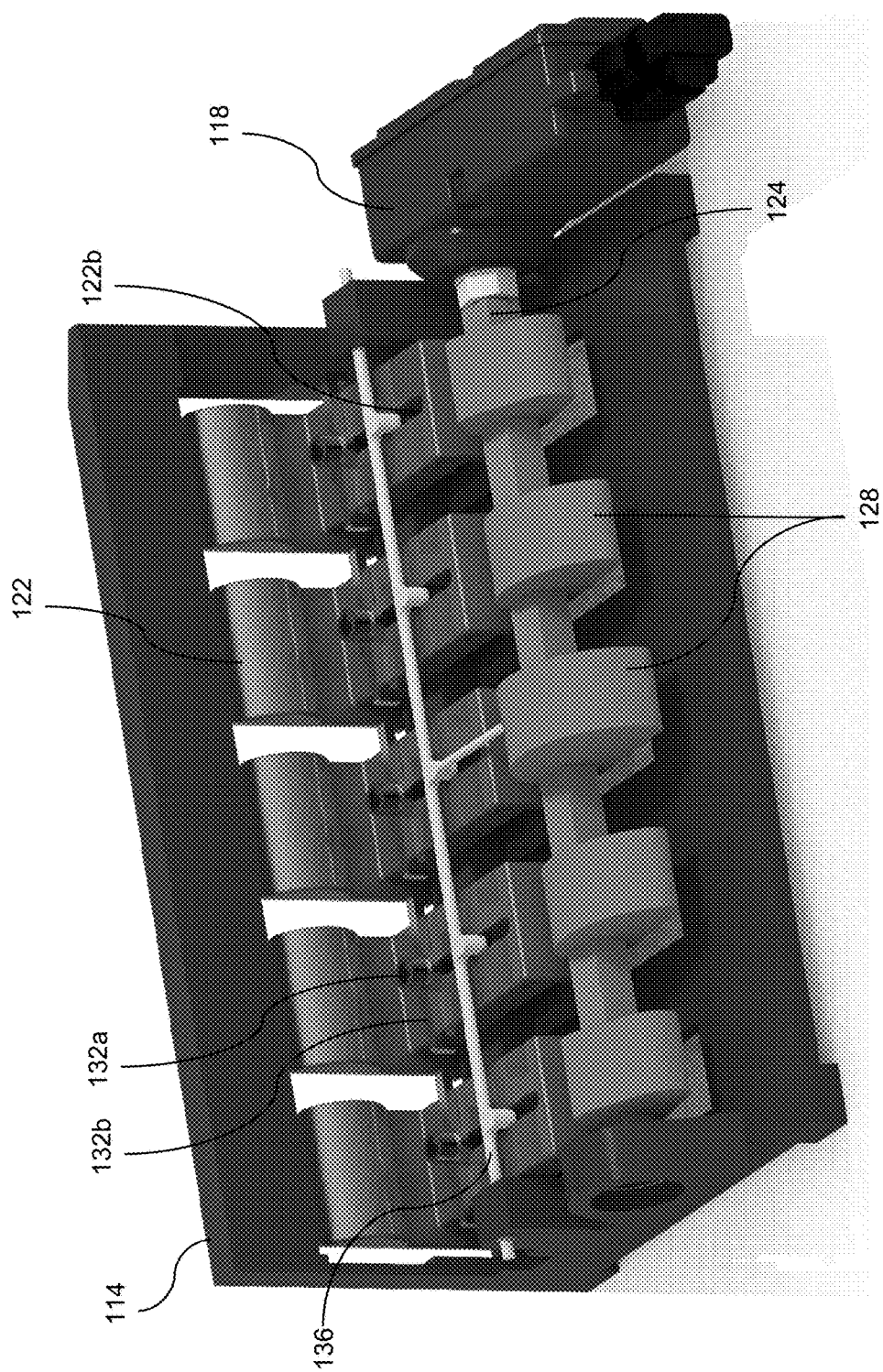
Figure 17:
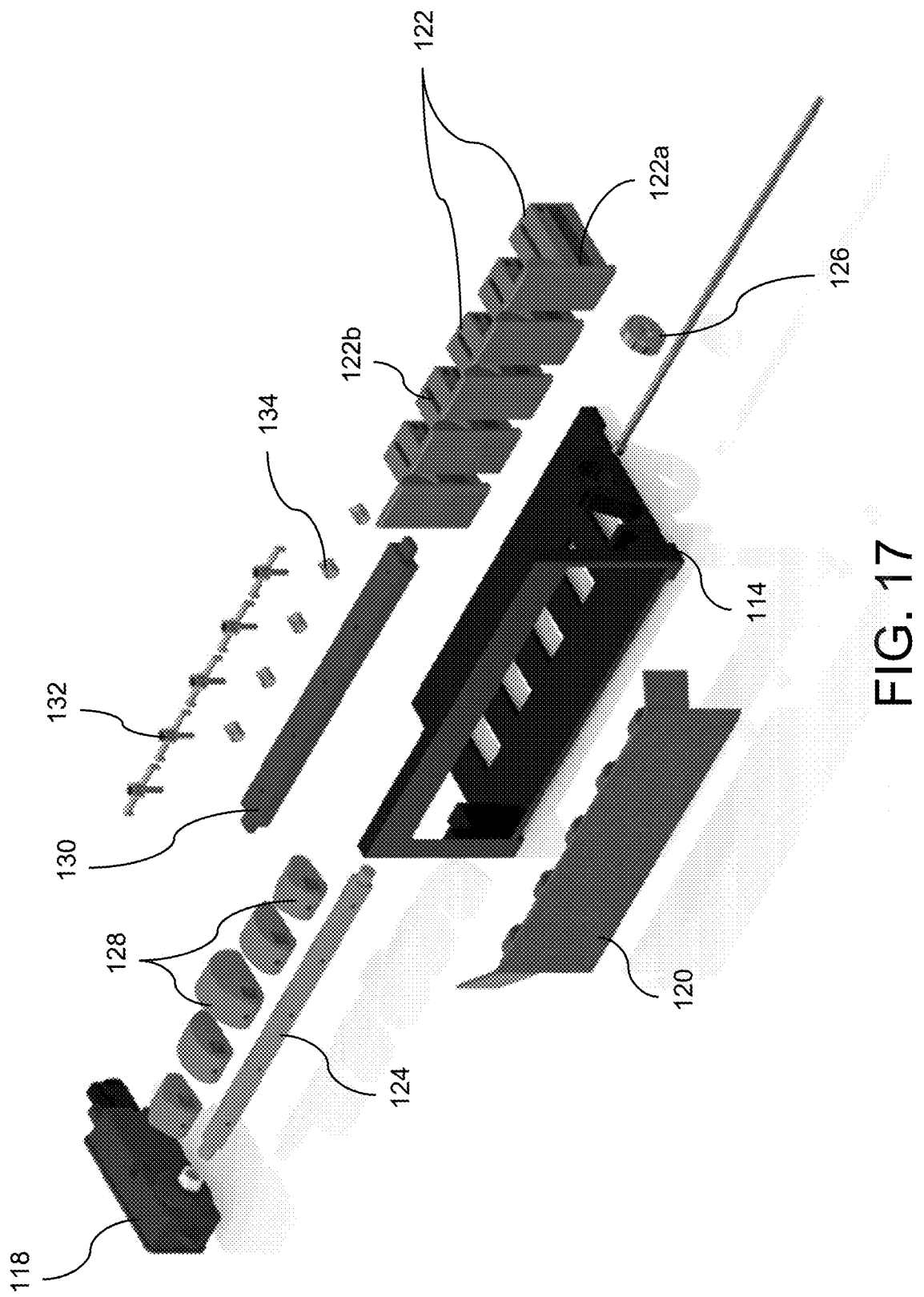
FIG. 17 is another exploded view of the door handle assembly of FIG. 9.

A release cable 136 is coupled to the sliders 122 and moves with the sliders 122 between the recessed and extended positions. For example, the release cable 136 may extend through respective channels or passageways or apertures of each slider 122 (FIG. 11) or the release cable 136 may extend along and attach to upper surfaces of the sliders 122 (FIG. 16). The release cable 136 may flex to accommodate movement of the sliders 122 relative to one another (FIG. 13). When the handle portion 116 is in the extended position and the user grasps the handle portion 116 to manually move the handle portion 116 further beyond the extended position (i.e., the user pulls the handle portion 116) or the user engages the cover 120 to move the handle portion 116 toward the recessed position (i.e., the user presses or pushes on the cover 120 to move the handle portion 116 toward the base portion 114 to actuate the handle assembly), the manual force from the user moves at least one slider 122 relative to the base portion 114, which in turn imparts movement of the release cable 136 and releases the latch mechanism of the vehicle door.

With the latch mechanism released, the user may grasp the handle portion 116 to manually open the door. Optionally, a door actuator may operate to move the vehicle door at least partially toward an opened position. For example, the door actuator may move the door partially toward the opened position, where the user may grasp the handle portion 116 or a secondary handle (e.g., at a side surface of the door) to manually move the door the rest of the way to the opened position.

Thus, the handle assembly 110 includes the flexible outer surface or cover 120 that is movable between the recessed position, where the outer surface 120 is flush with the outer surface of the door, and the extended position, where the outer surface 120 is extended or bowed outward from the outer surface of the door to present a handle or pocket or an actuatable button for the user to engage. The material of the flexible outer surface may correspond to or match the surface of the door at or near or surrounding the handle assembly to provide the appearance that the handle is extending from the surface of the door. For example, with interior door handle assemblies, the flexible outer surface may include leather or vinyl or woven fabric to match materials of the interior door panel. This creates a living wave-like and aesthetically pleasing presentation to users with a smooth motion of the flexible cover 120.

The flexible cover 120 is presented to the user via operation of the actuator 118 that rotates the cam shaft 124. The cam shaft 124 includes the cams 128 that engage sliders 122 to extend the sliders 122 and thus the flexible cover 120 when rotated. The cam shaft may be tunable (i.e., the cams 28 may be adjusted or differently configured) to allow the handle to be presented in different ways, such as a wave pattern. The follower bar 130 and the guide pins 132 restrict the degrees of freedom of the sliders 122 so that the sliders 122 are only movable laterally relative to the base portion 114 to extend and retract the handle portion 116. The return spring maintains contact between the sliders 122 and the cams 128. The sliders 122 are connected to the release cable 136 to transmit the manual force from the user to the release cable 136. The door handle assembly provides a door handle mechanism with living style that is versatile to be integrated across multiple product lines.

Optionally, the door handle assembly may include a light module or lighting element, such as for illuminating the door handle portion or the inner portion of the door handle portion, so that the user can readily see and discern the door handle when approaching the vehicle in low lighting conditions. In some examples, the lighting element may comprise a strip light or pocket light or the like, and the door handle assembly may include a ground illumination light and/or other light or lighting element, such as a projection light or the like, such as by utilizing aspects of the door handle assemblies and lighting systems described in U.S. Pat. Nos. 11,441,338; 10,632,968; 10,569,697; 9,102,266; 8,786,401; 8,801,245; 5,371,659; 5,497,305; 5,669,699; 5,823,654; 6,349,450; and/or 6,550,103, and/or U.S. Patent Pub. Nos. US-2023-0114112; US-2023-0001849 and/or US-2021-0332619 and/or U.S. provisional application Ser. No. 63/584,999, filed Sep. 25, 2023, which are all hereby incorporated herein by reference in their entireties.

The handle assembly may comprise any suitable type of vehicle door handle assembly, such as a strap type handle or a paddle type vehicle door handle assembly (having a paddle or handle portion that is pivotable about a generally horizontal pivot axis to open the vehicle door) and/or such as a handle assembly of the types described in U.S. Pat. Nos. 6,349,450; 6,550,103 and/or 6,907,643, which are hereby incorporated herein by reference in their entireties) or other type of vehicle door handle assembly. Optionally, the door handle assembly may include a soft touch handle portion, such as utilizing the principles described in U.S. Pat. Nos. 6,349,450; 6,550,103 and/or 6,907,643, incorporated above.

Although shown and described as being a generally horizontally oriented handle portion that moves laterally from the side of the vehicle, it is envisioned that the handle of the extendable flush door handle assembly may be oriented in any manner. For example, the handle may be oriented so that it is either vertical, horizontal, or diagonal with respect to the ground. Also, the vehicular door handle assembly may be suitable as an exterior door handle for opening a side door or rear door or lift gate of a vehicle from exterior the vehicle, or for use as an interior handle for opening a side door or rear door or liftgate of a vehicle from inside the vehicle.

Optionally, the door handle assembly or module may include or may be associated with an antenna for receiving signals from or communicating with a remote device. For example, the antenna (such as, for example, an antenna of the types described in U.S. Pat. No. 6,977,619 and/or U.S. Publication No. US-2010-0007463, which are hereby incorporated herein by reference in their entireties) may communicate a signal to the door locking system via a wire connection or the like, or wirelessly, such as via a radio frequency signal or via an infrared signal or via other wireless signaling means. For example, the handle assembly may include an antenna or sensor (such as an antenna and/or capacitive sensor) at the handle portion and/or may include a passive entry device or element. The antenna or sensor and/or passive entry device may receive a signal from a transmitting device (such as from a key fob or the like carried by the driver of the vehicle) and/or may sense or detect the presence of or proximity of a person or person's hand at or near the door handle, and may generate an output signal indicative of such detection. The actuator may be responsive to the antenna and/or sensor and/or device to impart an outward movement of the door handle portion so that the user can grasp the handle portion to open the door of the vehicle. Further, operation of the light module may be responsive to an input, such as when the door is unlocked and/or the handle portion is extended for grasping by the user.

Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208 and/or 6,568,839, all of which are hereby incorporated herein by reference in their entireties), or the vehicle ignition, or any other desired system.

Optionally, the door handle assembly of the present invention may include a soft touch handle portion, such as utilizing the principles described in U.S. Pat. Nos. 6,349,450; 6,550,103; and 6,907,643, which are hereby incorporated herein by reference in their entireties. Optionally, the door handle assembly may include an antenna or the like, such as for sensing or transmitting signals, such as described in U.S. Pat. No. 6,977,619, which is hereby incorporated herein by reference in its entirety.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:
   a base portion configured to mount the vehicular exterior door handle assembly at a door of a vehicle;
   a handle portion including a grasping portion;
   wherein, with the vehicular exterior door handle assembly mounted at the door of the vehicle, the handle portion is movable relative to the base portion between (i) a recessed position where the grasping portion of the handle portion is recessed at the base portion and not graspable by a user and (ii) an extended position where the grasping portion of the handle portion protrudes outward from the base portion and is graspable by the user;
   a light module that is electrically operable to emit light, wherein, with the vehicular exterior door handle assembly mounted at the door of the vehicle, the light module is disposed between the base portion and an outer panel at the door of the vehicle at a cutout region of the outer panel at the door of the vehicle;
   wherein the light module comprises a light emitting element;
   wherein, with the handle portion in the recessed position, the light emitting element of the light module at least partially circumscribes the handle portion;
   wherein the light emitting element of the light module comprises a light pipe that, with the handle portion in the recessed position, at least partially circumscribes the handle portion at the cutout region of the outer panel at the door of the vehicle, and wherein the light module comprises a light source that is electrically operable to emit light that illuminates the light pipe;
   wherein the light pipe comprises a U-shape;

wherein, with the handle portion in the extended position, the handle portion extends at least partially through the cutout region of the outer panel at the door of the vehicle; and wherein, with the handle portion in the extended position, and when the light module is electrically operated to emit light, the light emitting element of the light module emits light that passes through the cutout region at the outer panel at the door to illuminate the handle portion.

2. The vehicular exterior door handle assembly of claim 1, wherein the light pipe comprises a first end and a second end, and when the light source comprises (i) a first light source disposed at the first end of the light pipe and (ii) a second light source disposed at the second end of the light pipe.

3. The vehicular exterior door handle assembly of claim 1, wherein the light pipe comprises (i) a first portion that extends along a first edge of the cutout region of the outer panel at the door and (ii) a second portion that extends along a second edge of the cutout region of the outer panel at the door, and wherein the second edge opposes the first edge.

4. The vehicular exterior door handle assembly of claim 1, wherein the light module comprises a bracket mounted to the base portion, and wherein the bracket accommodates the light pipe and the light source.

5. The vehicular exterior door handle assembly of claim 4, wherein the bracket comprises a cutout region, and wherein, with the handle portion in the extended position, the handle portion extends at least partially through the cutout region of the bracket and the cutout region of the outer panel at the door of the vehicle.

6. The vehicular exterior door handle assembly of claim 1, wherein the light module is electrically operated to emit light responsive to the handle portion being moved from the recessed position toward the extended position.

7. The vehicular exterior door handle assembly of claim 1, wherein, with the handle portion in the recessed position, and when the light module is electrically operated to emit light, the light module emits light that emanates from between the base portion and the outer panel at the door of the vehicle and through a gap between the outer panel at the door of the vehicle and the handle portion.

8. A vehicular exterior door handle assembly, the vehicular exterior door handle assembly comprising:
   a base portion configured to mount the vehicular exterior door handle assembly at a door of a vehicle;
   a handle portion including a grasping portion;
   wherein, with the vehicular exterior door handle assembly mounted at the door of the vehicle, the handle portion is movable relative to the base portion between (i) a recessed position where the grasping portion of the handle portion is recessed at the base portion and not graspable by a user and (ii) an extended position where the grasping portion of the handle portion protrudes outward from the base portion and is graspable by the user;
   a light module that is electrically operable to emit light, wherein, with the vehicular exterior door handle assembly mounted at the door of the vehicle, the light module is disposed between the base portion and an outer panel at the door of the vehicle at a cutout region of the outer panel at the door of the vehicle;
   wherein the light module comprises (i) a light pipe, (ii) a light source that is electrically operable to emit light that illuminates the light pipe and (iii) a bracket mounted to the base portion, and wherein the bracket accommodates the light pipe and the light source;
   wherein, with the handle portion in the recessed position, the light pipe of the light module at least partially circumscribes the handle portion;
   wherein the light pipe comprises (i) a first portion that extends along a first edge of the cutout region of the outer panel at the door and (ii) a second portion that extends along a second edge of the cutout region of the outer panel at the door, and wherein the second edge opposes the first edge;
   wherein the light pipe comprises a U-shape;
   wherein, with the handle portion in the extended position, the handle portion extends at least partially through the cutout region of the outer panel at the door of the vehicle; and
   wherein, with the handle portion in the extended position, and when the light module is electrically operated to emit light, the light pipe emits light that passes through the cutout region at the outer panel at the door to illuminate the handle portion.

9. The vehicular exterior door handle assembly of claim 8, wherein the light pipe comprises a first end and a second end, and when the light source comprises (i) a first light source disposed at the first end of the light pipe and (ii) a second light source disposed at the second end of the light pipe.

10. The vehicular exterior door handle assembly of claim 8, wherein the bracket comprises a cutout region, and wherein, with the handle portion in the extended position, the handle portion extends at least partially through the cutout region of the bracket and the cutout region of the outer panel at the door of the vehicle.

11. The vehicular exterior door handle assembly of claim 8, wherein the light module is electrically operated to emit light responsive to the handle portion being moved from the recessed position toward the extended position.

12. The vehicular exterior door handle assembly of claim 8, wherein, with the handle portion in the recessed position, and when the light module is electrically operated to emit light, the light pipe emits light that emanates from between the base portion and the outer panel at the door of the vehicle and through a gap between the outer panel at the door of the vehicle and the handle portion.

\* \* \* \* \*